(12) United States Patent
Gehrke et al.

(10) Patent No.: US 9,169,794 B2
(45) Date of Patent: Oct. 27, 2015

(54) TEMPERATURE-CONTROLLED EXHAUST GAS RECIRCULATION SYSTEM AND METHOD FOR DUAL FUEL ENGINE

(71) Applicant: Caterpillar Inc., Peoria, IL (US)

(72) Inventors: Christopher R. Gehrke, Chillicothe, IL (US); Martin Willi, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 387 days.

(21) Appl. No.: 13/709,486

(22) Filed: Dec. 10, 2012

(65) Prior Publication Data

US 2014/0158088 A1 Jun. 12, 2014

(51) Int. Cl.
*F02M 25/07* (2006.01)
*F02D 41/30* (2006.01)
(Continued)

(52) U.S. Cl.
CPC ............... *F02D 41/30* (2013.01); *F02D 19/10* (2013.01); *F02D 41/0025* (2013.01); *F02D 41/0027* (2013.01); *F02D 41/0055* (2013.01); *F02D 41/3094* (2013.01); *F02D 41/403* (2013.01); *F02M 25/0707* (2013.01); *F02M 25/0728* (2013.01); *F02M 25/0738* (2013.01); *F02D 2041/0067* (2013.01); *F02M 25/0731* (2013.01);
(Continued)

(58) Field of Classification Search
CPC ........... F02D 19/06; F02D 1/00; F02D 41/30; F02D 41/402; F02D 2250/00; F02M 25/07; F02M 25/0726; F02M 25/0735; Y02T 10/32; Y02T 10/36
USPC .......... 123/1 A, 27 GE, 41.05, 299, 445, 446, 123/568.12, 568.17, 568.19, 568.2, 574, 123/575; 701/103, 104, 108
See application file for complete search history.

(56) References Cited

U.S. PATENT DOCUMENTS 2,928,382 A 3/1960 Hug
5,365,902 A 11/1994 Hsu
(Continued)

FOREIGN PATENT DOCUMENTS

JP 2011-202624 A 10/2011
WO WO 2012/021990 A1 2/2012

OTHER PUBLICATIONS

KIPO, International Search Report in International Patent Application No. PCT/US2013/072361, 4 pp., Mar. 14, 2014.
(Continued)

*Primary Examiner* — John Kwon
*Assistant Examiner* — Johnny H Hoang
(74) *Attorney, Agent, or Firm* — Leydig, Voit & Mayer, Ltd.

(57) ABSTRACT

Systems and methods for operating an engine include controlling a temperature of recirculated exhaust gas to achieve a predetermined recirculated exhaust gas temperature. A mixture of air and temperature-controlled recirculated exhaust gas are admitted in a combustion chamber and a gaseous fuel injector delivers gaseous fuel during an intake stroke. A diesel fuel injector is activated for a first time to deliver a pre-pilot diesel quantity directly into the combustion chamber at an early stage of a compression stroke, and is activated again for a second time to deliver a pilot diesel quantity directly into the combustion chamber at a later stage of the compression stroke. A total air/fuel ratio within the combustion chamber upon completion of the second diesel fuel injector activation is lean. The air/fuel mixture is combusted during a combustion stroke, and combustion products are removed during an exhaust stroke.

17 Claims, 4 Drawing Sheets

(51) Int. Cl.
  *F02D 19/10* (2006.01)
  *F02D 41/40* (2006.01)
  *F02D 41/00* (2006.01)

(52) U.S. Cl.
  CPC ............ *F02M 25/0754* (2013.01); *Y02T 10/36* (2013.01); *Y02T 10/44* (2013.01); *Y02T 10/47* (2013.01)

(56) References Cited

U.S. PATENT DOCUMENTS

| | | | |
|---|---|---|---|
| 5,937,800 A | 8/1999 | Brown et al. | |
| 6,032,617 A | 3/2000 | Willi et al. | |
| 6,564,784 B1 * | 5/2003 | Onodera et al. | 123/568.12 |
| 6,675,748 B2 | 1/2004 | Ancimer et al. | |
| 7,121,254 B2 | 10/2006 | Wickman et al. | |
| 7,603,225 B2 | 10/2009 | Araki et al. | |
| 8,001,778 B2 | 8/2011 | Sun | |
| 8,589,002 B1 * | 11/2013 | Henry et al. | 701/19 |
| 2004/0118557 A1 | 6/2004 | Ancimer et al. | |
| 2007/0028901 A1 * | 2/2007 | Watakabe et al. | 123/568.12 |
| 2011/0005503 A1 | 1/2011 | Harden et al. | |
| 2011/0139131 A1 * | 6/2011 | Kardos et al. | 123/542 |
| 2011/0192367 A1 | 8/2011 | Reitz et al. | |
| 2011/0288751 A1 * | 11/2011 | Kurtz | 701/109 |

OTHER PUBLICATIONS

KIPO, Written Opinion in International Patent Application No. PCT/US2013/072361, 8 pp., Mar. 14, 2014.

* cited by examiner

TEMPERATURE-CONTROLLED EXHAUST GAS RECIRCULATION SYSTEM AND METHOD FOR DUAL FUEL ENGINE

TECHNICAL FIELD

This patent disclosure relates generally to engine systems and, more particularly, to engine systems using gaseous fuels.

BACKGROUND

Use of liquefied gas as a fuel source for various applications has gained popularity in recent years due to the lower cost and cleaner burning of gaseous fuels such as liquefied petroleum gas (LPG), compressed natural gas (CNG), or liquefied natural gas (LNG), as compared to more traditional fuels such as gasoline or diesel. In practical applications, for example, mining trucks, locomotives, highway trucks and the like, the engine may operate primarily on natural gas, which is a fuel requiring ignition. Ignition may be provided by a spark or by introduction of a compression ignition fuel such as diesel at pilot quantities within the engine cylinders.

Typical compression ignition engines such as diesel engines operate under relatively high compression ratios, for example, in the range of 16:1 to 17:1, which are required for diesel self ignition within the engine cylinders during engine operation. Spark ignition engines such as engines operating under an Otto cycle utilize a spark or glow plug to ignite the air/fuel mixture within the engine cylinders at a predetermined time. In spark ignition engines, self-ignition of the air/fuel mixture is undesired and, typically, detrimental to normal engine operation. Spark ignition engines typically use lower compression ratios than compression ignition engines. For example, natural gas engines may use a compression ratio of about 11:1 to 12:1.

As can be appreciated, compression ignition dual fuel engines using a diesel pilot to ignite a natural gas/air mixture are faced with conflicting design parameters because, although a high compression ratio is required to ignite the diesel pilot, the high compression ratio may also cause the natural gas to prematurely self-ignite. When low compression ratios are used to avoid self-detonation of the natural gas/air mixture, insufficient cylinder temperatures and pressures may lead to unacceptable variability in the diesel ignition, which can affect normal engine operation especially when lean air/fuel ratios are used.

SUMMARY

The disclosure describes, in one aspect, a dual fuel engine system. In one embodiment, the dual fuel engine system includes an internal combustion engine configured to operate using a first fuel, and a second fuel provided in mixture with air and recirculated exhaust gas in at least one combustion chamber. The recirculated gas is conveyable between an exhaust system and an intake system of the internal combustion engine. The dual fuel engine system further includes a first fuel supply system associated with a first fuel injector, which is configured to inject one or more predetermined quantities of the first fuel directly into the at least one combustion chamber. A second fuel supply system is associated with a second fuel injector, which is configured to deliver a predetermined quantity of the second fuel into the at least one combustion chamber. A first exhaust gas recirculation (EGR) passage is fluidly connected between the exhaust system and the intake system, and a second EGR passage is fluidly connected between the exhaust system and the intake system. An EGR cooler is disposed to cool exhaust gas passing through the second EGR passage. A three-way EGR valve has an inlet in fluid communication with the exhaust system, an un-cooled gas outlet fluidly connected to the first EGR passage, and a cooled gas outlet fluidly connected to the second EGR passage. The three-way EGR valve is operable to selectively permit passage of a first EGR gas stream through the first EGR gas passage and a second EGR gas stream through the second EGR gas passage. The first and second EGR gas streams are arranged to mix and form a third EGR gas stream during operation of the internal combustion engine. The third EGR gas stream has an EGR gas temperature that is between a first temperature of the first EGR gas stream and a second temperature of the second EGR gas stream after the second EGR gas stream has passed through the EGR cooler. A controller associated with the three-way EGR valve is configured to control operation of the three-way EGR valve such that the EGR gas temperature approaches a predetermined temperature value.

In another aspect, the disclosure describes an internal combustion engine. The internal combustion engine includes at least one cylinder that reciprocably accepts a piston. The at least one cylinder at least partially defines a combustion chamber between an inner cylinder wall, the piston, and a cylinder head. The combustion chamber is fluidly connectable to an intake manifold, via an intake runner, and to an exhaust manifold. A diesel fuel injector is disposed to inject diesel fuel directly into the combustion chamber. A natural gas injector is disposed to inject natural gas into the intake runner. An un-cooled exhaust gas recirculation (EGR) passage is fluidly connected directly between the exhaust manifold and the intake manifold. The un-cooled exhaust passage is adapted to direct a first flow of EGR gas at a first temperature. A cooled EGR passage is fluidly connected between the exhaust system and the intake system. The cooled EGR passage includes an EGR cooler disposed to cool a second flow of EGR passing through the cooled EGR passage from the first temperature to a second temperature. An EGR valve arrangement is associated with the cooled and un-cooled EGR passages. The EGR valve arrangement is disposed to selectively control a flow rate of each of the first and second flows of EGR. The first and second flows of EGR are mixed to provide a third flow of EGR having an EGR gas temperature that is between the first and second temperatures. A controller is associated with the EGR valve arrangement and configured to control the flow rate of each of the first and second flows of EGR such that the EGR gas temperature approaches a predetermined temperature value.

In yet another aspect, the disclosure describes a method for operating an internal combustion engine. The method includes controlling a temperature of recirculated exhaust gas to achieve a predetermined recirculated exhaust gas temperature, and admitting a mixture of air and the recirculated exhaust gas in a combustion chamber during an intake stroke. A gaseous fuel injector for delivering a gaseous fuel into the combustion chamber is also activated during the intake stroke. A diesel fuel injector is activated for a first time to deliver a pre-pilot diesel quantity directly into the combustion chamber at an early stage of a compression stroke. The diesel fuel injector is activated for at least a second time for delivering a pilot diesel quantity directly into the combustion chamber at a later stage of the compression stroke. In one embodiment, a total air/fuel ratio within the combustion chamber upon completion of the second diesel fuel injector activation is lean. The air/fuel mixture within the combustion chamber is combusted during a combustion stroke, and combustion products are removed from the combustion chamber during an exhaust stroke.

DETAILED DESCRIPTION

This disclosure relates to internal combustion engines and, more particularly, to natural gas engines using diesel as a pilot fuel to initiate combustion within engine cylinders. The engine systems and methods described herein are suitable for use in mobile applications such as trucks, locomotives, earth-moving machines and the like, stationary applications such as generators, compressors and the like, or marine applications. Further, it should be appreciated that the source of the gaseous engine fuel may be provided via an onboard storage tank, for example, a cryogenic liquefied natural gas tank, a pressurized gas tank, or from another gas source such as from a petroleum product extraction, distribution, transfer or refinery operation.

Figure 1:
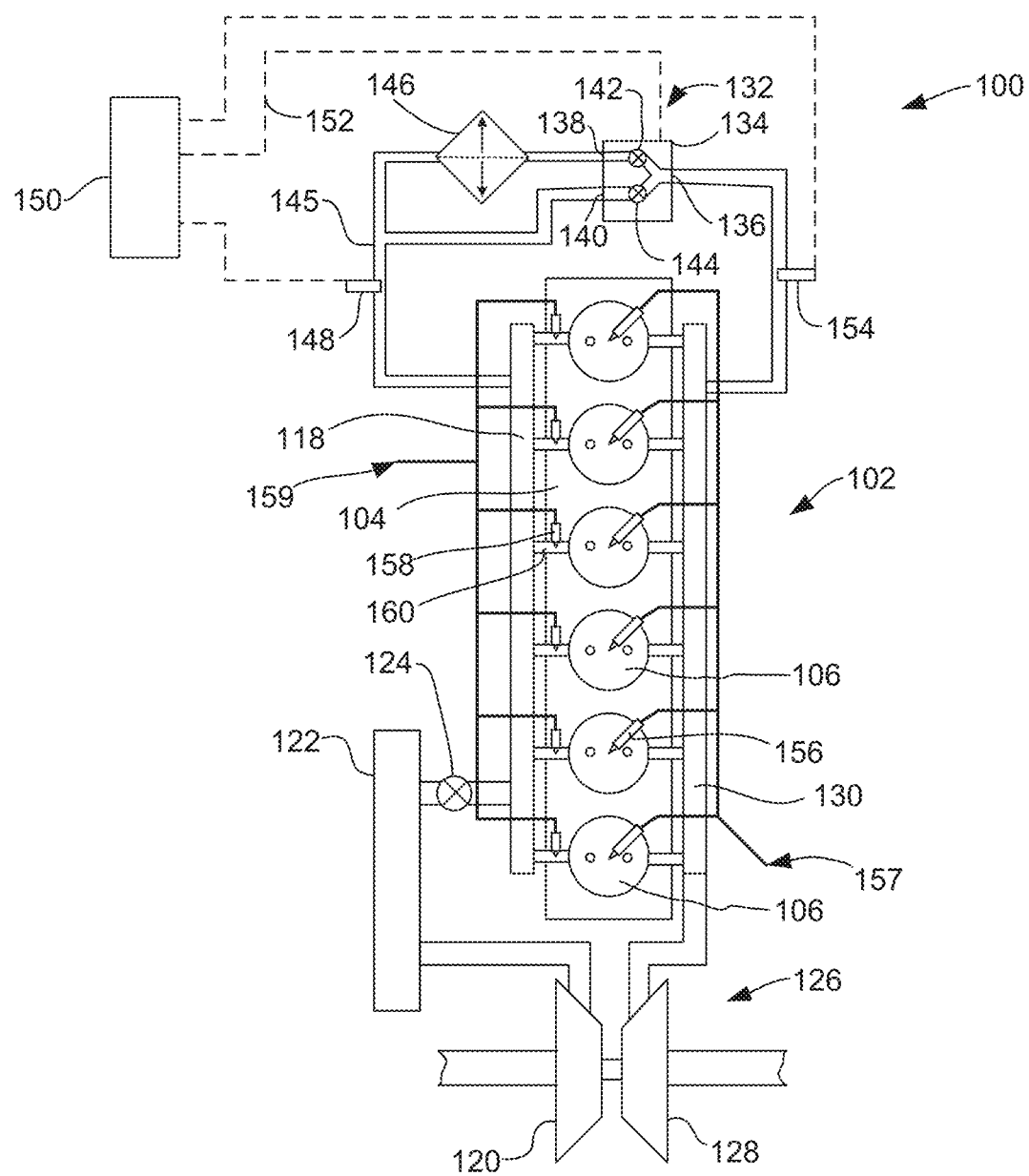
FIG. 1 is a block diagram for an engine system in accordance with the disclosure.
Figure 2:
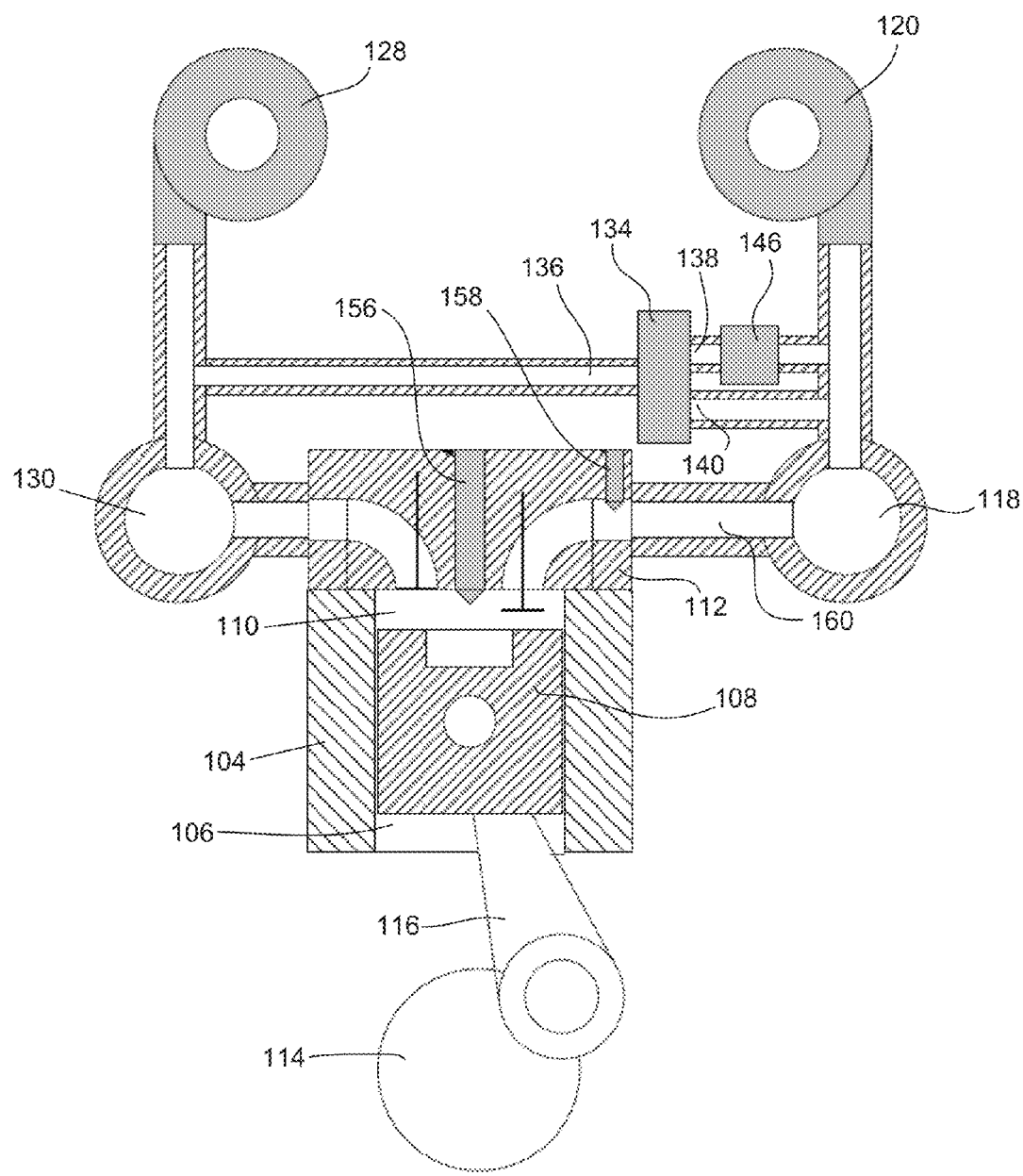
FIG. 2 is a schematic view of an engine cylinder cross section in accordance with the disclosure.

A block diagram illustrating one embodiment for an engine system 100 is shown in FIG. 1. A cross section of an engine cylinder is shown in FIG. 2. In primary reference to FIG. 1, the engine system 100 includes an engine 102 having a cylinder case 104 that surrounds a plurality of engine cylinders 106. Although six engine cylinders 106 are shown in an inline configuration, fewer or more than six cylinders may be used in the same or a different configuration. Each cylinder 106 includes a reciprocable piston 108 (FIG. 2) that defines a combustion chamber 110 (FIG. 2) having a variable volume between the walls of the cylinder 106, the piston 108, and a cylinder head 112 (FIG. 2). As is known, combustion of an air/fuel mixture within each combustion chamber 110 provides power that pushes the piston 108, which is connected to and turns a crankshaft 114 (FIG. 2) via a connecting rod 116.

Air is provided to the combustion chambers 110 via an intake manifold 118, which, in the illustrated embodiment, receives cooled and compressed charge air from a compressor 120 through a charge air cooler 122. The pressure and/or flow rate of the charge air can optionally be controlled or adjusted by a throttle valve 124. In the illustrated engine system 100, the compressor 120 is part of a turbocharger 126, which includes a turbine 128 that is connected to an configured to receive exhaust gas from an exhaust manifold 130. Energy extracted from the exhaust gas by the turbine 128 operates the compressor 120 but in alternative embodiment, alternate modes of air compression may be used.

The engine system 100 further includes an exhaust gas recirculation (EGR) system 132, which is fluidly connected between the intake manifold 118 and the exhaust manifold 130. In the illustrated embodiment, the EGR system 132 is advantageously configured to provide exhaust gas from the exhaust manifold 130 to the intake manifold 118 and, thus, the combustion chambers 110. As shown, the EGR system 132 is configured in what is commonly referred to as a high pressure loop (HPL) configuration, which means that exhaust gas is extracted from the engine exhaust system upstream of the turbine 128, i.e., under relatively high pressure conditions, and is provided to the engine intake system at a location downstream of the compressor 120. Alternatively, the EGR system may be configured in what is referred to as a low pressure loop (LPL) configuration, i.e. between a location in the engine exhaust system that is downstream of at least one turbine and a location in the engine intake system that is upstream of at least one compressor.

The EGR system 132 is configured to provide exhaust gas at a variable temperature that ranges between cylinder-out exhaust temperature on a high end, and a cooled temperature that depends on engine coolant temperature on the low end. As shown, the EGR system 132 includes a three-way valve arrangement 134, which includes an exhaust gas inlet 136 that is directly fluidly connected to the exhaust manifold 130, a first or cooled exhaust gas outlet 138, and a second or un-cooled exhaust gas outlet 140. In the embodiment shown, a first two-way valve 142 selectively fluidly blocks the cooled exhaust gas outlet 138 form the exhaust gas inlet 136, and a second two-way valve 144 selectively fluidly blocks the un-cooled exhaust gas outlet 140 but other valve configurations can be used. During operation, one or both of the first and second two-way valves 142 and 144 may be operated to provide either one of a mixture of cooled and un-cooled exhaust gas streams to the intake manifold 118. Exhaust gas conduits connected to the valve arrangement 134 are merged in a main EGR passage 145. Exhaust gas provided through the cooled exhaust gas outlet 138 is directed through an EGR cooler 146, which is embodied as a liquid-to-gas cooler operating to remove heat from the exhaust gas passing therethrough and to transfer the heat to engine coolant circulating through the EGR cooler 146.

The main EGR passage 145 includes a temperature sensor 148. The temperature sensor 148 is arranged to monitor EGR temperature and provide a signal indicative of that temperature to an electronic controller 150. The electronic controller 150 may be a single controller or may include more than one controller disposed to control various functions and/or features of a machine that is associated with the engine system 100. For example, a master controller, used to control the overall operation and function of the machine may be cooperatively implemented with a motor or engine controller, used to control the engine 102. In this embodiment, the term "controller" is meant to include one, two, or more controllers that may be associated with the engine system 100 and that may cooperate in controlling various functions and operations of the engine system 100. The functionality of the controller, while described conceptually herein to include various discrete functions for illustrative purposes only, may be implemented in hardware and/or software without regard to the discrete functionality shown. Accordingly, various interfaces of the controller are described relative to components of the engine system 100 shown in the block diagram of FIG. 1. Such interfaces are not intended to limit the type and number of components that are connected, nor the number of controllers that are described.

Accordingly, the controller 150 is configured to receive information signals indicative of the temperature of EGR gas passing through the main EGR passage 145 and to control the relative opening of the first and second valves 142 and 144 such that the measured or otherwise estimated gas temperature within the main EGR passage 145 approaches a desired temperature for any given set of engine operating conditions. In the illustrated embodiment, the controller 150 provides command signals via a communication line 152 to each of the first and second two-way valves 142 and 144, to control their operation such that a desired mixture of cooled and un-cooled exhaust gas is provided in mixture to achieve the desired EGR gas temperature in the main EGR passage 145. Thus, during operation, when warmer EGR gas is desired, the first valve 142 may be instructed to move towards a closing direction in which more fluid blockage is provided between the inlet 136 and the cooled gas outlet 138, while at the same time the second two-way valve 144 may be instructed to move towards an opening direction in which less fluid blockage is provided between the inlet 136 and the un-cooled gas outlet 140. Similarly, when colder EGR gas is desired, the first valve 142 may be instructed to move towards an opening direction in which less fluid blockage is provided between the inlet 136 and the cooled gas outlet 138, while at the same time the second two-way valve 144 may be instructed to move towards a closing direction in which more fluid blockage is provided between the inlet 136 and the un-cooled gas outlet 140.

The desired EGR gas temperature may be determined in the controller 150 based on the then present engine operating condition, for example, as determined based on the then present engine speed and load operating point. That same engine operating point may be used to determine a desired overall EGR rate, i.e. the overall desired ratio of EGR gas with respect to total engine air flow. Apart from the relative opening or closing position of each of the first and second two-way valves 142 and 144, which can control the EGR gas temperature, the total gas flow opening area of both valves can be controlled by the controller 150 to set the desired EGR rate. In one embodiment, the gas flow opening area of each of the first and second two-way valves 142 and 144 may be determined by a dedicated position sensor associated with each valve, a pressure difference across each valve, or any other appropriate means. Moreover, information about the gas inlet temperature or, stated differently, the engine exhaust temperature, may be provided to the controller 150 via an exhaust temperature sensor 154. In one embodiment, the exhaust temperature of the engine may be used to adjust the control parameters and sensitivity of the controller 150.

During operation, two different fuel types are provided to each combustion chamber 110. In the illustrated embodiment, a diesel injector 156 is associated with each cylinder 106 and configured to directly inject a predetermined amount of diesel fuel directly into the respective combustion chamber 110. Diesel fuel is provided pressurized from a first fuel source 157, which can include various components and systems such as a fuel reservoir, fuel pump and others, which are well known in the art and are not shown here for simplicity. A natural gas injector 158 is disposed in an intake runner 160, which is a passage fluidly connecting each respective cylinder 106 with the intake manifold 118, for indirectly injecting natural gas within the combustion chamber 110 during an intake stroke of the piston 108. Natural gas is supplied to the natural gas injectors 158 from a natural gas source 159, which provides natural gas at an operating pressure and flow rate.

In one contemplated embodiment, the engine 102 operates as a compression ignition engine primarily on natural gas and using direct diesel fuel injection as an ignition source. The engine advantageously operates at a compression ratio appropriate for a spark ignited gas engine, as previously described, and is configured to operate efficiently at both full and part load conditions within acceptable exhaust emission constraints by using split direct diesel injection, in combination with indirect gas injection and temperature-controlled EGR. The desired EGR temperature is determined on the basis of engine load as a primary control parameter.

More specifically, a first diesel injection event occurs during the compression stroke to enhance the ignition and combustion characteristics of the air fuel mixture in the combustion chamber, which already includes the natural gas fuel in mixture with air. As previously discussed, the natural gas fuel is provided during the intake stroke. A second diesel injection event occurs later in the compression stroke to provide an ignition source.

Figure 3:
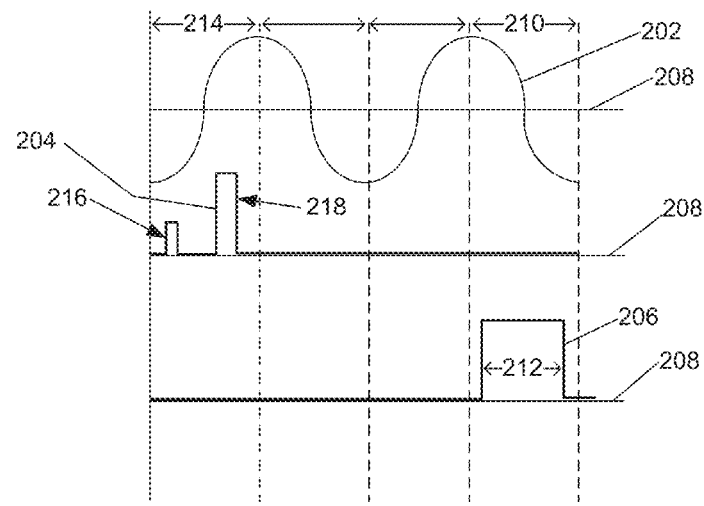
FIG. 3 is a representative timing chart showing fuel injector activations in accordance with the disclosure.
Figure 4:
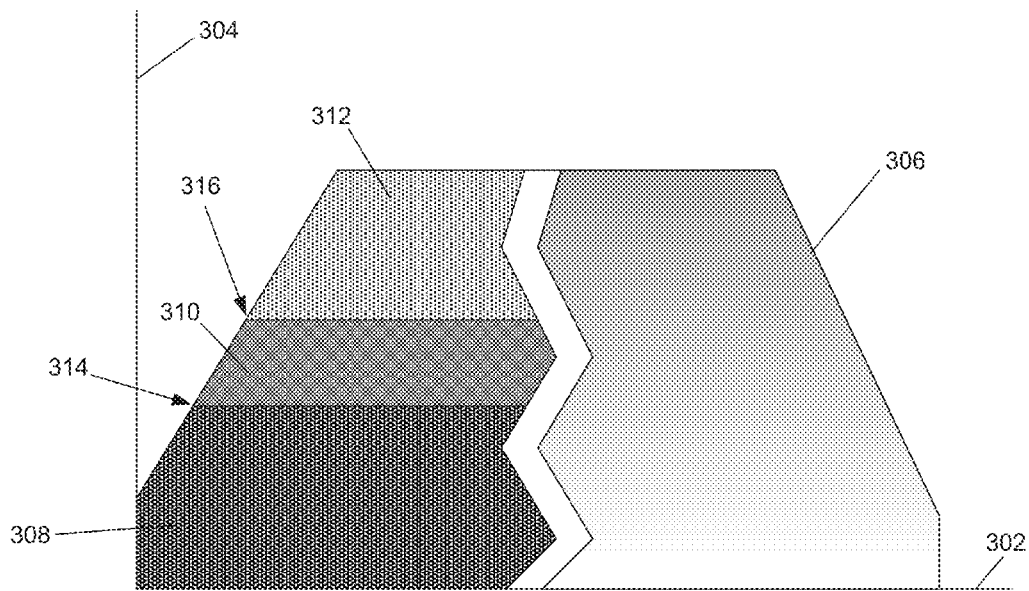
FIG. 4 is a qualitative engine map illustrating various control areas for exhaust gas recirculation temperatures in accordance with the disclosure.

When the engine operates at a relatively high load, cooled EGR is introduced in the gaseous fuel/air intake chamber mixture in the combustion chamber. When the engine operates at light or part loads, un-cooled or hot EGR is added to the intake charge. Use of hot exhaust gas at light or part loads permits use of a relatively lean air/fuel ratio mixture at low engine loads despite a relatively low compression ratio. In general, the described combustion strategy improves the coefficient of variation of the engine, as indicated by the engine's mean effective pressure, throughout the engine's power range. Two qualitative charts are shown in FIGS. 3 and 4 to illustrate these concepts. In FIG. 3, a timing diagram showing the various injection events is shown. FIG. 4 is a qualitative engine map showing EGR temperature bands.

In reference to FIG. 3, a time chart illustrates piston position 202, diesel injector activation 204, and natural gas injector activation 206 with respect to crank angle 208, which is shown in time-aligned fashion for all parameters and is represented along the respective horizontal axes. Relative to the piston position 202, four strokes can be defined. An intake stroke 210 represents the downward motion of the piston, which increases the volume of the combustion chamber such that the combustion chamber may fill with air or a mixture of air with exhaust gas. During the intake stroke 210, the natural gas injector opens for a period 212 to allow natural gas to mix with the incoming air to the cylinder.

Following the intake stroke 210 is a compression stroke 214, during which, as is known, a cylinder intake valve is closed thus effectively sealing the contents of the combustion cylinder for compression. During the compression stroke 214, the diesel injector is activated early on for a first pilot injection event 216, and then again later for a second diesel pilot injection event 218. It is believed that the fuel provided to the cylinder during the first injection event sufficiently disperses and mixes with the natural gas/air mixture present in the cylinder to effectively enhance the ignition and combustion characteristics thereof. The second diesel pilot injection event 218 provides the diesel fuel that can initiate combustion by compression, even though relatively low air/fuel ratios are used, which are on par with spark ignition engines. The ability of air/fuel mixture in the cylinders to reliably ignite under relatively low compression ratios is attributed to the temperature of fluids within the cylinder, which depending on the load of the engine can be controlled by controlling the temperature of the EGR that is provided.

A qualitative engine map is shown in FIG. 4, where engine speed 302 is represented by the horizontal axis and engine load 304 is represented on the vertical axis. A qualitative engine lug curve 306 is represented with a generally trapezoidal shape for simplicity, but it should be appreciated that any other shape can be considered depending on the particular engine application. Because the concept of illustrating engine operating points on an engine map of engine speed versus engine load are well known in the art, they will not be described in further detail herein.

The engine map 300 is shown in two alternative implementations, each shown on the right or left side of the chart. On the left side of the chart, the collection of engine operating points below the lug curve 306 are separated in three regions: a low load region 308, which is shaded dark, an intermediate load region 310, and a high load region 312, which is shaded light. In one embodiment, un-cooled or hot EGR is supplied to the engine in the low load region 308, and only cooled EGR in supplied to the engine in the high load region 312. During steady or transitional engine operation in the intermediate load region 310, a mixture of cooled and un-cooled EGR can be used. The ratio of cooled and uncooled EGR when operating in the intermediate load region can be implemented in any way, for example, empirically, by engine testing at the various operating conditions, or analytically, for example, by using a linear correlation. In one embodiment, the EGR cooling extent is linearly related to engine load such that uncooled EGR is used at a lower boundary 314 between the low and intermediate load regions 308 and 310 and cooled EGR is used at the upper boundary 316 between intermediate and high load regions 310 and 312. In such embodiment, the ratio between cooled and un-cooled EGR may change linearly between the lower and upper boundaries 314 and 316 of the intermediate engine load region 310.

In an alternative embodiment, as illustrated on the right side of FIG. 4, a desired EGR temperature may change continuously with respect to engine load over the entire region of engine operating points below the lug curve 306. The particular desired temperature for each engine operating condition may be determined empirically or analytically within an electronic controller. In one embodiment, tables populated with desired EGR temperatures with respect to engine speed and load are used to interpolate between tabulated data and determine, for each engine operating condition, a desired EGR temperature. In the embodiment shown on the right side of FIG. 3, darker shading is meant to indicate lower EGR temperature.

Figure 5:
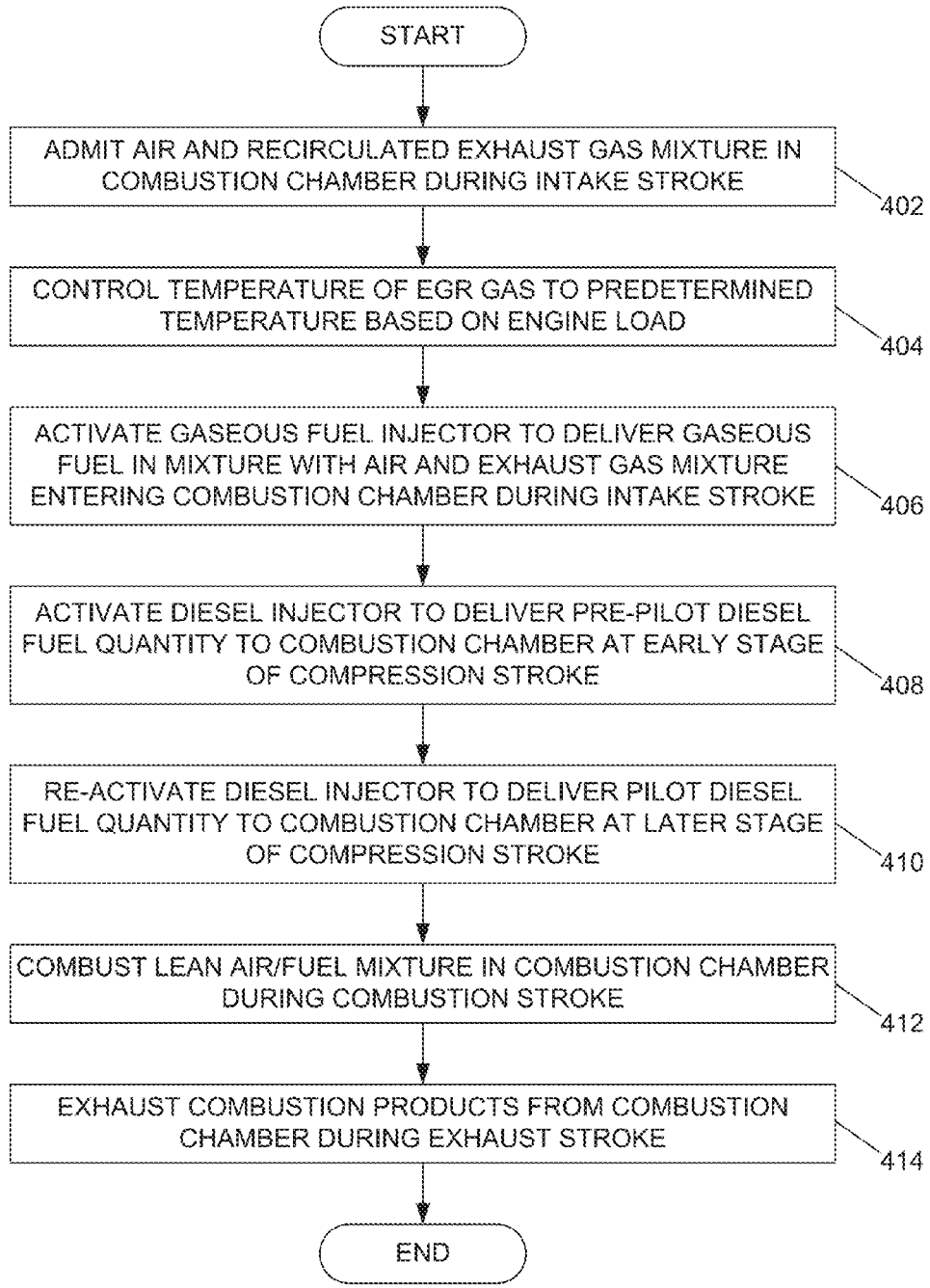
FIG. 5 is a flowchart for a method in accordance with the disclosure.

A flowchart for a method of operating an engine is shown in FIG. 5. In this embodiment, the engine may operate in a four stroke combustion system that includes intake, compression, combustion and exhaust strokes. A mixture of air and recirculated exhaust gas is admitted in a combustion chamber at 402 during an intake stroke. A temperature of the EGR gas in mixture with the incoming air to the combustion cylinder is controlled to a predetermined temperature at 404. To control the temperature of the EGR gas, in one embodiment, a controller provides commands to a hot-EGR valve and to a cooled-EGR valve to appropriately open such that cooled and un-cooled EGR gas at different temperatures may mix to provide an EGR gas mixture having a temperature that approaches a desired EGR gas temperature. A determination of the desired EGR temperature may also be carried out based on engine load as a primary control parameter.

During at least a portion of the intake stroke, a gaseous fuel injector configured to deliver gaseous fuel in mixture with air entering the combustion chamber is activated at 406. At an early stage of a compression stroke, a diesel fuel injector is activated to deliver a pre-pilot quantity of diesel fuel directly into the combustion chamber at 408. At a later stage of the compression stroke, the diesel fuel injector is activated for a second time to deliver a pilot quantity of diesel fuel directly into the combustion chamber at 410. Ignition of an air/fuel mixture in the combustion chamber is initiated following the injection of the pilot diesel fuel at 410. The air/fuel mixture in the combustion chamber, which is arranged to be extremely lean or, stated differently, to have a lambda ($\lambda$) in the range of between 1.5 and 2.2, combusts during a combustion stroke at 412, and the byproducts of that combustion are exhausted from the combustion cylinder at 414. The process described herein may repeat continuously for each engine cylinder combustion cycle during engine operation, and may be adapted appropriately for combustion cycles having more than four strokes, for example, six or eight strokes.

INDUSTRIAL APPLICABILITY

The present disclosure is applicable to internal combustion engines operating on natural gas as the primary fuel and using diesel or another fuel as an in-cylinder ignition source. It is contemplated that the systems and methods described herein are applicable for all types of engine applications, and can be modified to suit the particular power requirements of each engine application. For example, the rate of EGR substitution of fresh engine air, the temperature of EGR, the amount and types of fuels used, the injection methodology and timing that delivers fuel to the combustion cylinders, and other parameters may be selected in accordance with the base operating principles described herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A dual fuel engine system including an internal combustion engine configured to operate using a first fuel and a second fuel provided in mixture with air and recirculated exhaust gas in at least one combustion chamber, the recirculated gas being conveyable between an exhaust system and an intake system of the internal combustion engine, the dual fuel engine system comprising:
a first fuel supply system associated with a first fuel injector, the first fuel injector configured to inject one or more predetermined quantities of the first fuel directly into the at least one combustion chamber;
a second fuel supply system associated with a second fuel injector, the second fuel injector configured to deliver a predetermined quantity of the second fuel into the at least one combustion chamber;
a first exhaust gas recirculation (EGR) passage fluidly connected between the exhaust system and the intake system;
a second EGR passage fluidly connected between the exhaust system and the intake system;
an EGR cooler disposed to cool exhaust gas passing through the second EGR passage;
a three-way EGR valve having
an inlet in fluid communication with the exhaust system,
an un-cooled gas outlet fluidly connected to the first EGR passage, and
a cooled gas outlet fluidly connected to the second EGR passage, the three-way EGR valve being operable to selectively permit passage of a first EGR gas stream through the first EGR gas passage and a second EGR gas stream through the second EGR gas passage;

wherein the first and second EGR gas streams are arranged to mix and form a third EGR gas stream during operation of the internal combustion engine, the third EGR gas stream having an EGR gas temperature that is between a first temperature of the first EGR gas stream and a second temperature of the second EGR gas stream after the second EGR gas stream has passed through the EGR cooler;

a controller associated with the three-way EGR valve and configured to control operation of the three-way EGR valve such that the EGR gas temperature approaches a predetermined temperature value;

wherein the controller is disposed to receive information indicative of an engine load operating condition of the internal combustion engine, and determine the predetermined temperature value using the engine load as a primary control parameter.

2. The dual fuel engine system of claim 1, wherein the internal combustion engine operates on a four stroke combustion system that includes intake, compression, combustion and exhaust strokes, wherein the second fuel is natural gas, and wherein a predetermined quantity of natural gas is provided in mixture with incoming air to the at least one combustion chamber during the intake stroke.

3. The dual fuel engine system of claim 2, wherein the first fuel is diesel and wherein the first fuel injector is configured to provide a pre-pilot quantity of diesel early during the compression stroke, and a main pilot quantity of diesel later during the compression stroke.

4. The dual fuel engine of claim 1, wherein the predetermined temperature is closer to the first EGR gas temperature when the engine load operating condition indicates a low engine load, and is closer to the second EGR gas temperature when the engine load operating condition indicates a high engine load.

5. The dual fuel engine of claim 1, wherein the first temperature is close to an engine cylinder-out exhaust temperature, and wherein the second temperature is close to an engine coolant temperature.

6. The dual fuel engine of claim 1, wherein the three-way valve includes a first two-way valve disposed to selectively fluidly connect the inlet with the un-cooled gas outlet, and a second two-way valve disposed to selectively fluidly connect the inlet with the cooled gas outlet.

7. An internal combustion engine, comprising:
at least one cylinder that reciprocably accepts a piston, the at least one cylinder at least partially defining a combustion chamber between an inner cylinder wall, the piston, and a cylinder head, the combustion chamber being fluidly connectable to an intake manifold via an intake runner and to an exhaust manifold;
a diesel fuel injector disposed to inject diesel fuel directly into the combustion chamber;
a natural gas injector disposed to inject natural gas into the intake runner;
an un-cooled exhaust gas recirculation (EGR) passage fluidly connected directly between the exhaust manifold and the intake manifold, the un-cooled exhaust passage adapted to direct a first flow of EGR gas at a first temperature;
a cooled EGR passage fluidly connected between the exhaust system and the intake system, the cooled EGR passage including an EGR cooler disposed to cool a second flow of EGR passing through the cooled EGR passage from the first temperature to a second temperature;
an EGR valve arrangement associated with the cooled and un-cooled EGR passages, the EGR valve arrangement disposed to selectively control a flow rate of each of the first and second flows of EGR, wherein the first and second flows of EGR are mixed to provide a third flow of EGR having an EGR gas temperature that is between the first and second temperatures;
a controller associated with the EGR valve arrangement and configured to control the flow rate of each of the first and second flows of EGR such that the EGR gas temperature approaches a predetermined temperature value;
wherein the controller is disposed to receive information indicative of an engine load operating condition of the internal combustion engine, and determine the predetermined temperature value using the engine load as a primary control parameter.

8. The internal combustion engine of claim 7, wherein the at least one cylinder operates on a four stroke combustion system that includes intake, compression, combustion and exhaust strokes, and wherein a predetermined quantity of natural gas is provided in mixture with incoming air to the at least one combustion chamber during the intake stroke.

9. The internal combustion engine of claim 8, wherein the diesel fuel injector is configured to provide a pre-pilot quantity of diesel early during the compression stroke, and a main pilot quantity of diesel later during the compression stroke.

10. The internal combustion engine of claim 7, wherein the predetermined temperature is closer to the first temperature when the engine load operating condition indicates a low engine load, and closer to the second temperature when the engine load operating condition indicates a high engine load.

11. The internal combustion engine of claim 7, wherein the first temperature is close to an engine cylinder-out exhaust temperature, and wherein the second temperature is closer to an engine coolant temperature than to the engine cylinder-out exhaust temperature.

12. The internal combustion engine of claim 7, wherein the EGR valve arrangement includes an inlet in fluid communication with the exhaust manifold, an un-cooled EGR gas outlet, and a cooled EGR gas outlet, and wherein the EGR cooler is disposed between the cooled EGR gas outlet and the intake manifold.

13. A method for operating an internal combustion engine, comprising:
controlling a temperature of recirculated exhaust gas to achieve a predetermined recirculated exhaust gas temperature;
admitting a mixture of air and the recirculated exhaust gas in a combustion chamber during an intake stroke;
during the intake stroke, activating a gaseous fuel injector for delivering a gaseous fuel into the combustion chamber;
activating a diesel fuel injector for a first time for delivering a pre-pilot diesel quantity directly into the combustion chamber at an early stage of a compression stroke;
activating the diesel fuel injector for at least a second time for delivering a pilot diesel quantity directly into the combustion chamber at a later stage of the compression stroke, wherein a total air/fuel ratio within the combustion chamber upon completion of the second diesel fuel injector activation is lean;
combusting an air/fuel mixture within the combustion chamber during a combustion stroke;

removing combustion products from the combustion chamber during an exhaust stroke; and operating an electronic controller, the electronic controller disposed to receive information indicative of an engine load operating condition of the internal combustion engine, and determine the predetermined temperature value using the engine load as a primary control parameter.

14. The method of claim 13, wherein the recirculated exhaust gas is separated into a first stream and a second stream, the first stream passing directly from exhaust system of the internal combustion engine to an intake system thereof, and the second stream passing through an exhaust gas recirculation cooler as it is directed from the exhaust to the intake systems of the internal combustion engine.

15. The method of claim 14, further comprising mixing controlled amounts of the first and second streams such that a temperature of a resulting exhaust gas mixture has a temperature that approaches the predetermined recirculated exhaust gas temperature.

16. The method of claim 15, wherein said mixing of controlled amounts of the first and second streams is accomplished by the coordinated control of a valve arrangement disposed to selectively fluidly block a respective passage in which the first and second streams are passing.

17. The method of claim 13, wherein the predetermined temperature is selected to higher when the engine load operating condition indicates a low engine load, and lower when the engine load operating condition indicates a high engine load.

* * * * *